United States Patent
Tamminga

(10) Patent No.: US 7,967,502 B2
(45) Date of Patent: Jun. 28, 2011

(54) VERTICAL MIXER WITH MOVEABLE FLOOR

(75) Inventor: Jakob R. Tamminga, Orton (CA)

(73) Assignee: Jay-Lor International Inc., Ontario (CA)

( * ) Notice: Subject to any disclaimer, the term of this patent is extended or adjusted under 35 U.S.C. 154(b) by 925 days.

(21) Appl. No.: 11/853,535

(22) Filed: Sep. 11, 2007

(65) Prior Publication Data
US 2009/0067283 A1 Mar. 12, 2009

(51) Int. Cl.
B01F 7/24 (2006.01)
(52) U.S. Cl. ......... 366/193; 366/192; 366/319; 366/603
(58) Field of Classification Search .............. 366/192, 366/193, 318, 319, 603
See application file for complete search history.

(56) References Cited

U.S. PATENT DOCUMENTS

| | | | |
|---|---|---|---|
| 5,240,321 A | 8/1993 | Miller | |
| 5,462,354 A | 10/1995 | Neier | |
| 5,615,839 A | 4/1997 | Hartwig | |
| 5,803,375 A | 9/1998 | Hartwig | |
| 5,863,122 A | 1/1999 | Tamminga | |
| 6,409,376 B1* | 6/2002 | Knight | 366/141 |
| 6,929,394 B2 | 8/2005 | Tamminga | |
| 6,969,191 B2* | 11/2005 | Tamminga | 366/192 |
| 2004/0017729 A1* | 1/2004 | Tamminga | 366/143 |
| 2004/0090860 A1* | 5/2004 | Tamminga | 366/192 |

FOREIGN PATENT DOCUMENTS

| | | |
|---|---|---|
| CA | 2050630 | 3/1993 |
| CA | 2050631 | 3/1993 |
| CA | 2246390 | 1/1996 |
| CA | 2180997 | 3/1997 |
| CA | 2182909 | 3/1999 |
| CA | 2152193 | 11/1999 |
| CA | 248587 | 5/2006 |

* cited by examiner

*Primary Examiner* — David L Sorkin
(74) *Attorney, Agent, or Firm* — Summa, Additon & Ashe, P.A.

(57) ABSTRACT

A vertical mixer assembly for mixing a bulk material is disclosed. The vertical mixer assembly comprises a floor having an upper surface; at least one wall extending from the floor and having an interior surface and an upper edge; the floor and the at least one wall defining an open topped mixing chamber having a general tub-shape suitable for receiving the bulk material; at least one vertical auger positioned in the mixing chamber for mixing the bulk material, the auger having a flight suitable for mixing the bulk material upon operation of the auger; an opening in the mixing chamber for allowing egress of the bulk material, the opening having a wall portion and a floor portion; and a door assembly. The door assembly allows for more consistent unloading of the mixed bulk material and for quicker unloading of the mixed bulk material. The door assembly comprises a side door moveable between a closed position covering the wall portion of the opening and an open position exposing the wall portion of the opening; and a floor section moveable between a closed position covering the floor portion of the opening and an open position exposing the floor portion of the opening.

10 Claims, 5 Drawing Sheets

VERTICAL MIXER WITH MOVEABLE FLOOR

FIELD OF THE INVENTION

This invention is related to vertical mixer assemblies and in particular to door assemblies for allowing unloading of the mixed contents of vertical mixer assemblies.

BACKGROUND

Feed for livestock typically includes different ingredients which are required to be mixed together before they are provided to the livestock. For example, hay may be mixed with a variety of feed supplements, such as vitamins, to provide a bulk feed material. Various mixers are known which are designed to mix the bulk feed material to a desired extent. Vertical feed mixers are disclosed, for instance, in U.S. Pat. No. 5,863,122 (Tamminga) and in U.S. Pat. No. 5,462,354 (Neier).

Many prior art vertical mixers include a container having one or more walls and a floor defining a mixing chamber having a general tub shape, with a mixing means, typically one or more augers, vertically positioned in the mixing chamber. In conventional use, the components of the bulk material are mixed together and cut by rotation of the auger. After mixing, the mixed bulk material is dispensed as appropriate from the mixer assembly via a door in the side of the mixing chamber.

Removal of the mixed bulk material is usually done in one of several methods. The mixed bulk feed material may exit the mixing chamber simply by opening the side door and allowing the rotation of the auger to force the mixed bulk food out through the door. This results in a very inconsistent unloading of the bulk material. As the auger rotates usually about once every 1.5 seconds, a high volume segment and a low volume segment of ejected bulk material is observed. This is because on each rotation of the auger, the bottom flight of the auger pushes out a large volume of bulk material as it passes the door which is preceded and followed by a low volume of ejected bulk material associated with the flight of the auger rotating through the rest of its travel before passing the open door on the next rotation. The net result is a series of bulk material clumps deposited from the vertical mixer assembly. To spread out the clumps, a conveyor may be attached to the vertical mixer. In this arrangement the mixed bulk material exits though the door of the mixing chamber and is deposited on the conveyor. The speed of the conveyor may then be varied to attempt to evenly deposit the mixed bulk material.

One problem with the mixer described above is the uneven distribution of the mixed bulk material. It is desirable, for many reasons appreciated in the art, to have an even distribution of bulk material. This is especially significant when the bulk material is feed. However, the addition of a conveyor to facilitate the even distribution of the bulk material is very costly, adds the problem of a complicated device to the mixer and requires a much higher degree of maintenance.

Another method providing a vertical mixer that more evenly ejects mixed bulk material requires an increase in power. This results in increased fuel or energy consumption and can result in an increase in noise, pollution and less longevity.

A need therefore exists for a vertical mixer assembly that more evenly unloads mixed bulk material without requiring more power or depending on a conveyor for even unloading.

BRIEF SUMMARY

One embodiment provides for a vertical mixer assembly having an opening for allowing the unloading of mixed bulk material. The opening includes a portion in the wall of the vertical mixer and a portion in the floor of the vertical mixer. This allows for mixed bulk material to be both ejected by the rotation of the vertical auger therein and also exit by falling through at least the portion in the floor when the flight of the auger is not passing by the opening and pushing mixed bulk material out through the opening.

One embodiment provides for a vertical mixer assembly for mixing a bulk material, comprising:
a floor having an upper surface;
at least one wall extending from the floor and having an interior surface and an upper edge;
the floor and the at least one wall defining an open topped mixing chamber having a general tub-shape suitable for receiving the bulk material;
at least one vertical auger positioned in the mixing chamber for mixing the bulk material, the auger having a flight suitable for mixing the bulk material upon operation of the auger;
an opening in the mixing chamber for allowing egress of the bulk material, the opening having a wall portion and a floor portion; and
a door assembly comprising:
a side door moveable between a closed position covering the wall portion of the opening and an open position exposing the wall portion of the opening; and
a floor section moveable between a closed position covering the floor portion of the opening and an open position exposing the floor portion of the opening.

DETAILED DESCRIPTION

Figure 1A:
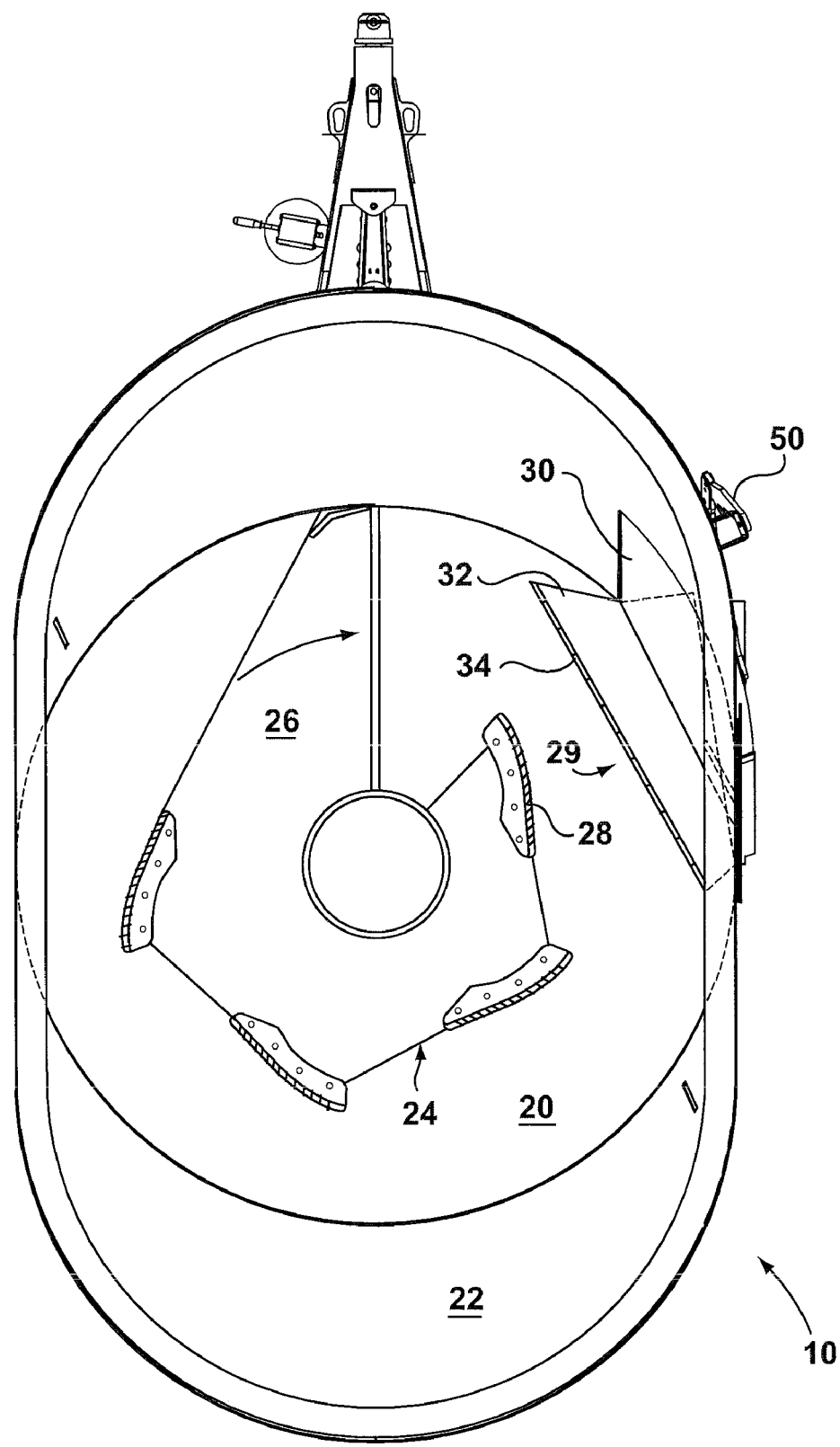
FIG. 1a is a top view illustrating one embodiment of a vertical mixer assembly showing an example of a door assembly in the closed position.
Figure 1B:
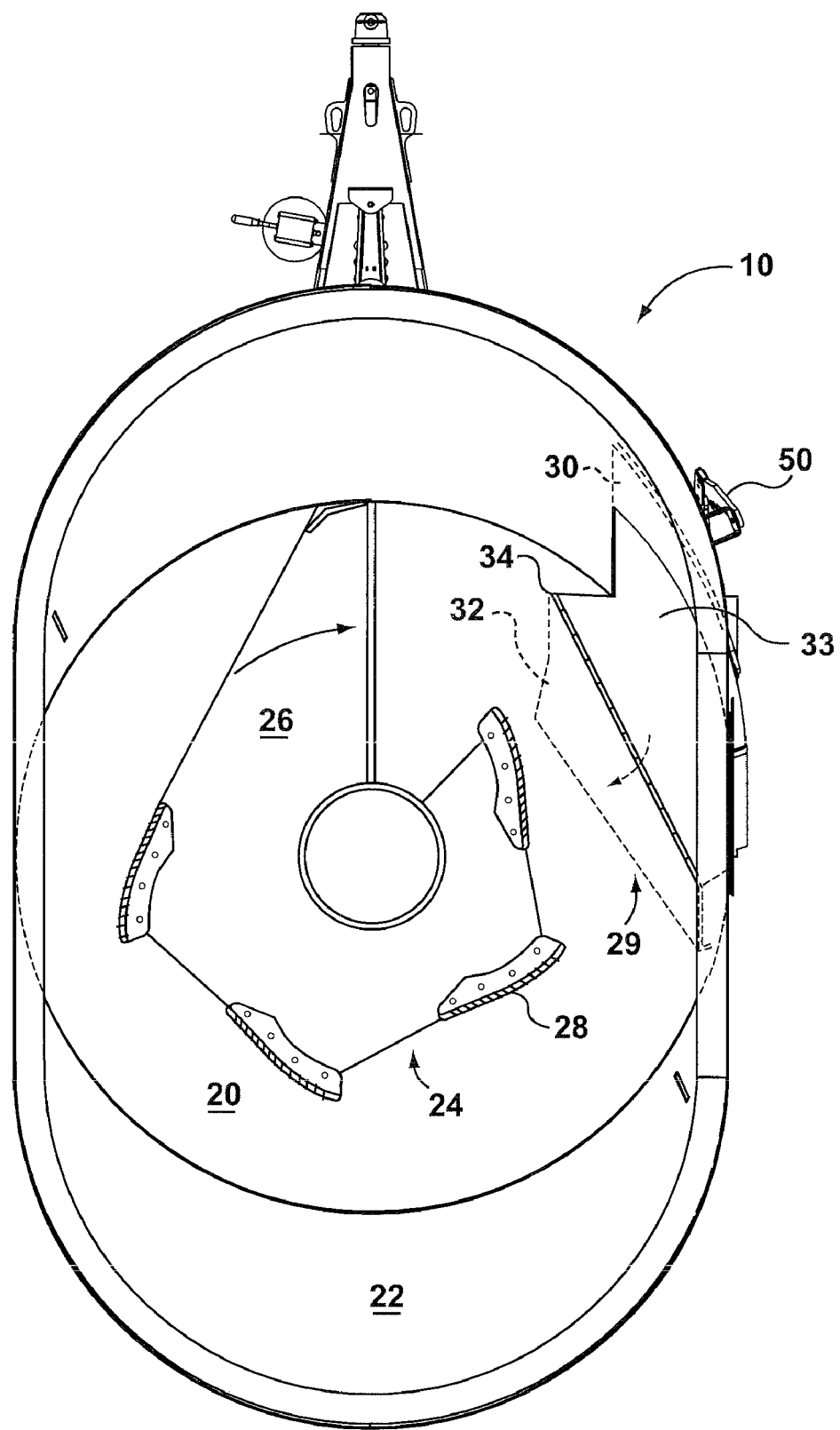
FIG. 1b is a top view illustrating one embodiment of a vertical mixer assembly showing an example of a door assembly in the open position.

One embodiment of a vertical mixer assembly for mixing bulk material is shown generally in FIGS. 1a and 1b as 10. The mixer assembly 10 comprises a floor 20 with depending wall 22 which together form a mixing chamber into which bulk material may be deposited for mixing and cutting. The mixing chamber has a general open topped tub shape suitable for receiving and holding bulk material while it is being mixed and cut by a suitable mixing device such as a vertical auger 24. It will be appreciated that the auger 24 is referred to as a vertical auger simply to distinguish from a horizontal auger and may not necessarily be mounted in an exact vertical plane. It will also be appreciated that a plurality of augers may be used in a single mixer assembly. The auger 24 is positioned within the mixing chamber and is driven by any suitable means. For simplicity, FIGS. 1a and 1b show only a bottom flight 26 of the auger 24. However, the auger 24 may have any number of flights suitable for mixing and cutting bulk material. The auger 24 may comprise knives 28 positioned on the flight 26 for facilitating the cutting of the bulk material. In the embodiment shown in FIGS. 1a and 1b, the rotation of the auger 24 is represented by the arrow which indicates a clockwise rotation. It will be appreciated by those skilled in the art that the mixer assembly 10 may be adapted for a counter-clockwise auger rotation without departing from the scope of the invention.

The mixer assembly 10 comprises a door assembly 29 which may open to allow for unloading of bulk material deposited into the mixer assembly 10.

Unlike conventional mixer assembly doors which are positioned in the wall 22 of the mixing chamber, the door assembly 29 of the present mixer assembly 10 comprises a side door 30 placed substantially in the wall 22 and an openable floor section 32 placed in the floor 20. In the embodiment illustrated in FIGS. 1a and 1b, the floor section is optionally adjacent the side door 30. The door assembly 29 allows for more consistent unloading of mixed bulk material and can allow for quicker unloading of mixed bulk material.

The side door 30 may open, for example, through the operation of a hydraulic arm 50 connected to the door. Opening may be done in the form of upward sliding travel of the side door 30 as illustrated for example in FIG. 1b.

The floor section 32 when in a closed position, such as that illustrated in FIG. 1a, forms part of the floor 20 of the mixing chamber of the mixer assembly 10. The floor section 32 is moveable to an open position, such as that illustrated in FIG. 1b. An open position may be achieved by pivoting the floor section 32 on a hinge 34 connected to a portion of the floor 20 of the mixer assembly 10. Movement of the floor section 32 may be controlled by any suitable means, for example using a hydraulic arm. Although FIG. 1b shows the hinge 34 connected to a backside of the floor section 32, it will be appreciated that the hinge 34 may be connected to any suitable interior side of the floor section 32, for example one of the interior connecting sides which connect the backside to the front exterior side. Any suitable hinge or slide arrangement may be used.

The floor section 32 and the side door 30 together form the door assembly 29 which when in an open position, such as that illustrated in FIG. 1b, provide an opening 33 in the mixing chamber for allowing egress of bulk material deposited in the mixing chamber. The opening consists of a portion in the wall 22 and the floor 20 of the mixing chamber.

The floor section 32 and the side door 30 may be opened substantially simultaneously to generate the opening 33 suitable for unloading of the bulk material.

The floor section 32 may be moved to various positions in the open position to allow for the opened floor section 32 to act as a chute for guiding the unloading of the bulk material as it exits the mixing chamber. For example, the floor section 32 may be pivoted to a position of various angles of between 1°-90° relative to the floor 20 to guide bulk material exiting from the mixing chamber. In this way, the distance that the bulk material is ejected from the mixer assembly may be controlled for a desired placement outside of the mixing chamber. For example, the floor section 32 may be opened to a position at 25°, 30°, 35°, 40°, 45°, 50°, 55°, 60°, 65°, 70°, 75°, 80°, 85° or 90°.

To facilitate operation of the door assembly 29, the side door 30 and the floor section 32 may be separate components that optionally operate simultaneously but as separate doors. By using a separate side door 30 and a separate floor section 32, as opposed to a side door that includes a section of the floor, overall operation of the door assembly may be improved. It has been found that upward/downward sliding of the side door 30 into the open/closed position is ideal. This diminishes the amount of bulk material that gets caught between the side door 30 and the wall 22 and allows for full travel of the side door 30. Prior doors, including those that have a component of the floor attached to the side door (see U.S. Pat. No. 6,929,394) use a hinge at the top edge of the side door and hydraulics to pivot the side door and attached floor component into the open position. The problem with such an arrangement is that after unloading of the mixed bulk material some remaining mixed bulk material is left snagged in the opening especially caught around the leading edge of the opening. This presents a problem in that the door cannot pivot completely shut because any snagged left over material blocks full closure of the door. This can lead to damage of the door, the hydraulic system operating the door, the wall of the mixing chamber, etc. A sliding door, as opposed to a pivoted door, can however push or cut any snagged leftover material out of the way upon closing of the side door. As will be discussed further below, a cutting knife may also be placed on the leading edge of the opening and/or the door to cut away any left over snagged material during the closing motion of the side door. Sliding of the side door is not possible when a floor component is fixed to the side door as a pivot action is necessary to ensure that the floor component does not hit the flight of the auger during operation of the door.

The embodiments illustrated in FIGS. 1a and 1b use a sliding side door 30 operated using a hydraulic arm 50 and a pivoting floor section 32 operated by a hydraulic arm (not shown). This arrangement allows for effective operation of the side door 30 as discussed above and for providing an opening in the floor 20 of the mixing chamber. To further increase effectiveness of the door assembly 29, provide for a more consistent volume of unloaded mixed bulk material and to increase the speed at which a load of bulk material may be unloaded from the mixer, the floor section 32 may extend and overlap with the footprint of at least the first flight 26 of the auger 24. This allows for mixed bulk material to be both pushed out of the door by the auger 24 and to fall through the door before and after the first flight 26 has passed by the opening 33. By providing an opening in the floor 20 by moving the floor section 32 for unloading, a more even distribution of the unloaded material is provided. This is because the pattern described above of a large volume of ejected bulk material associated with the passing of the first flight 26 of the auger 24 by the opening followed by very low volume of the ejected bulk material associated with rotation of the first flight back around the mixing chamber to the opening is avoided. Bulk material is ejected from the mixing chamber even when the first flight 26 of the auger 24 is rotating through an area of the mixing chamber which does not correspond to the opening 33. Mixed bulk material falls through the opening 33 during this time.

Figure 2A:
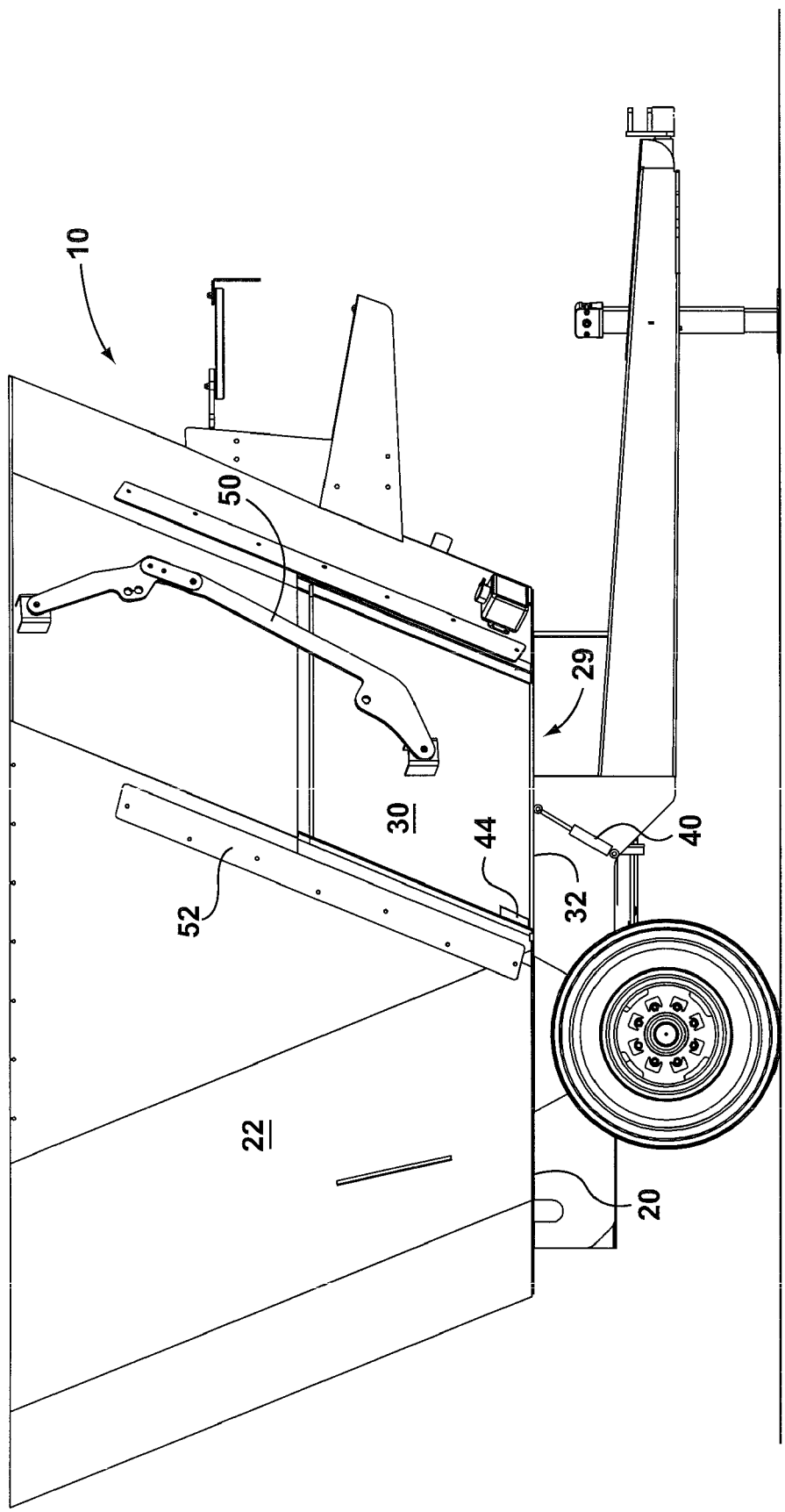
FIG. 2a is a side view illustrating one embodiment of a vertical mixer assembly showing an example of a door assembly in the closed position.
Figure 2B:
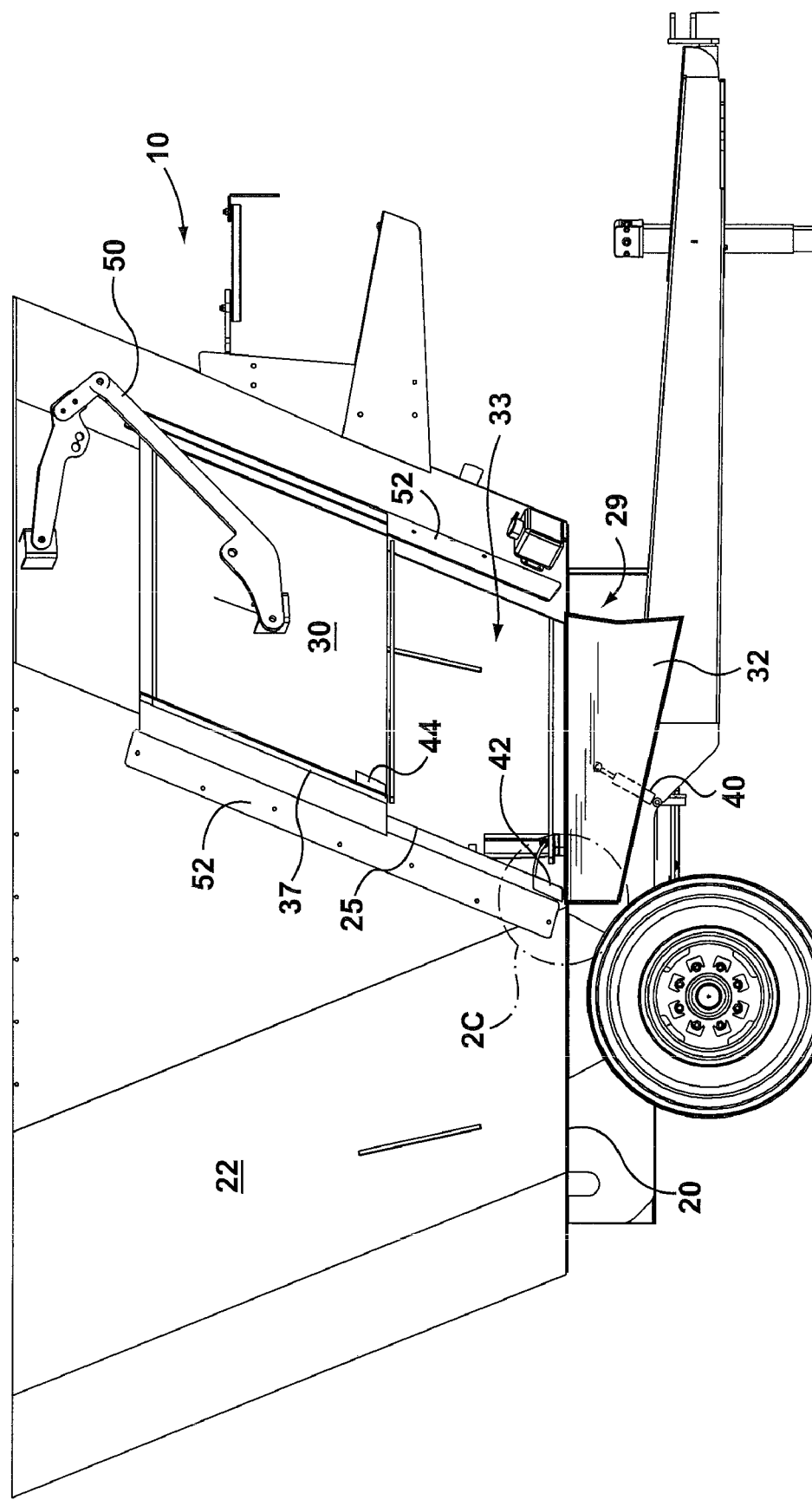
FIG. 2b is a side view illustrating one embodiment of a vertical mixer assembly showing an example of a door assembly in the open position.

FIGS. 2a and 2b illustrate an exterior side view of a vertical mixer assembly 10. FIG. 2a shows the mixer assembly 10 with the door assembly 29 in a closed position and FIG. 2b shows the mixer assembly 10 with the door assembly 29 in an open position.

The side door 30 slides in a rail 52 and is operated using any suitable device for sliding the door 30 between the open and closed position. The embodiment illustrated in FIGS. 2a and 2b uses a single hydraulic arm 50. It will be appreciated by those skilled in the art, that any suitable hydraulic setup may be used having any number of pistons and arms suitable for sliding the side door 30.

The floor section 32 is attached to the mixing chamber in such a way that it may be moved from a closed position in which the floor section 32 forms part of the floor 20 of the mixer assembly 10 to an open position allowing for bulk material in the mixing chamber to fall through the opening left by the open floor section 32. As outlined above, to further increase effectiveness of the door assembly 29 and to increase the speed at which a load of bulk material may be unloaded from the mixer assembly 10, the floor section 32 may extend and overlap with the footprint of at least the first flight 26 of the auger 24.

In the embodiment illustrated in FIGS. 2a and 2b, the floor section 32 is connected to the floor 20 of the mixer assembly 10 using any suitable device, for example a hinge. A telescoping hydraulic arm 40 is used to move the floor section 32 between the open position and the closed position. It will be appreciated that any suitable hydraulic system may be used for moving the floor section 32 between the open and closed positions. Further, the floor section 32 may not require a hinge about which it is pivoted, but alternatively may be slid, rotated or moved in any suitable manner to provide an opening through which bulk material may exit or be ejected. By using a hydraulic arm, the floor section may be pivoted about the hinge to any suitable open position such that the floor section 32 may act as a chute for guiding ejecting bulk material.

Figure 2C:
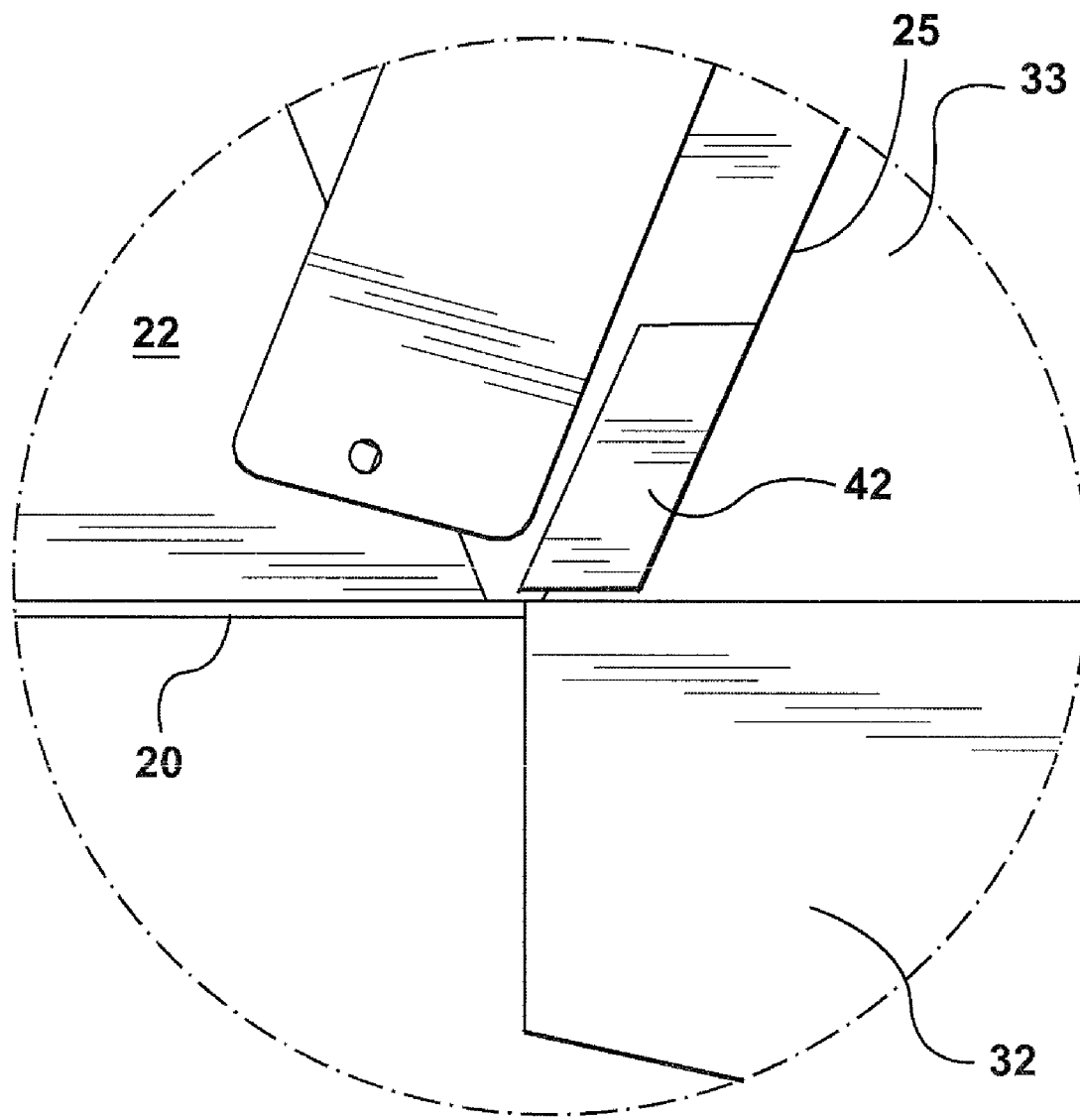
FIG. 2c is a side view illustrating one embodiment of the vertical mixer of FIG. 2b in closer detail.

As mentioned above, and illustrated in FIGS. 2b and 2c, the mixer assembly 10 may optionally include one or more knives positioned on the opening 33 and/or on the side door 30 and/or floor section 32 for cutting any snagged material which would be or is left behind following emptying of the mixing chamber. Optional placement of a side door knife 44 is shown in FIG. 2b. Clockwise rotation of the auger 24 can result in the snagging of material along the back leading edge 25 of opening 33. As a result, placement of the side door knife 44 along the back edge 37 of the side door 30 is useful in cutting away any snagged material when the door is slid into the closed position. A knife 42 may be placed on the back leading edge 25 of the opening 33 for cutting snagged material as it is formed and also for cutting away snagged material as the side door 30 or floor section 32 is closed. Any number of knives may be used both on the side door 30 or back leading edge 25. Additionally, the knives may be placed in any suitable position. The knives 42, 44 may also be either separate attachable components or may be integrated into the construction of the side door 30, mixing chamber and/or floor section 32.

Although the ejected mixed bulk material is unloaded in a more consistent volume, a conveyor may still be attached to the mixer assembly 10. A conveyor may be used for directing the mixed bulk material to a specific area such as a feeding trough. The conveyor may be moved using hydraulics and may be folded tight against the machine to minimize width for travel.

To further increase the speed at which the mixed bulk material exits and is ejected from the mixing chamber through the opening 33, the flights of the auger 24 may be shaped to more efficiently push mixed bulk material through the opening 33. The flight may additionally be shaped so as to increase the tumbling and mixing of the bulk material in the mixing chamber. The shape of the flight may also be adapted to cut the bulk material a substantially desired length.

In another embodiment, the opening in the mixing chamber is comprised of an opening in the wall 22 to be covered by a side door 30 and a separate opening in the floor 22 to be covered by the floor section 32. In this embodiment, the opening in the floor and the wall are not adjacent.

The present invention has been described with regard to a plurality of illustrative embodiments. However, it will be apparent to persons skilled in the art that a number of variations and modifications can be made without departing from the scope of the invention as defined in the claims.

The invention claimed is:

1. A vertical mixer assembly for mixing a bulk material, comprising:
   a floor having an upper surface;
   at least one wall extending from the floor and having an interior surface and an upper edge;
   the floor and the at least one wall defining an open topped mixing chamber having a general tub-shape suitable for receiving the bulk material;
   at least one vertical auger positioned in the mixing chamber for mixing the bulk material, the auger having a flight suitable for mixing the bulk material upon operation of the auger;
   an opening in the mixing chamber for allowing egress of the bulk material, the opening having a wall portion and a floor portion; and
   a door assembly comprising:
      a side door upwardly slideable on rails between a closed position covering the wall portion of the opening and an open position exposing the wall portion of the opening; and
      a floor section pivotably attached to the floor and pivotable between a closed position covering the floor portion of the opening and an open position exposing the floor portion of the opening;
      the floor section separate from the side door.

2. The vertical mixer assembly of claim 1, wherein the wall portion of the opening and the floor portion of the opening are adjacent.

3. The vertical mixer assembly of claim 1, wherein the floor section is pivotably attached to the floor at a backside thereof and pivots between the open position and the closed position.

4. The vertical mixer assembly of claim 1, wherein the side door and the floor section are moved between the respective open and closed positions using hydraulics, optionally substantially simultaneously.

5. The vertical mixer assembly of claim 1, wherein the wall portion of the opening comprises a knife along an outside edge thereof for cutting bulk material and/or the side door comprises a knife along an edge thereof for cutting bulk material.

6. The vertical mixer assembly of claim 1, wherein at least a portion of the flight of the auger passes over the movable floor section during rotation of the auger.

7. The vertical mixer assembly of claim 1, wherein the floor section is pivotable to a position between 1° and 90° relative to the floor to form at least part of a chute for guiding bulk material to be ejected from the mixing chamber.

8. The vertical mixer assembly of claim 1, wherein the floor section is wider than the side door.

9. The vertical mixer assembly of claim 1, further comprising a conveyer in communication with the opening.

10. A vertical mixer assembly for mixing a bulk material, comprising:
    a floor having an upper surface;
    at least one wall extending from the floor and having an interior surface and an upper edge;
    the floor and the at least one wall defining an open topped mixing chamber having a general tub-shape suitable for receiving the bulk material;
    at least one vertical auger positioned in the mixing chamber for mixing the bulk material, the auger having a flight suitable for mixing the bulk material upon operation of the auger;

an opening in the mixing chamber for allowing egress of the bulk material, the opening having a wall portion and an adjacent floor portion; and a door assembly comprising:

a side door upwardly slideable between a closed position covering the wall portion of the opening and an open position exposing the wall portion of the opening; and a floor section pivotable between a closed position covering the floor portion of the opening and an open position exposing the floor portion of the opening;

the floor section separate from the side door.

\* \* \* \* \*